July 3, 1962 K. B. BLY ETAL 3,042,452
VEHICLE WHEEL STRUCTURE
Filed Oct. 16, 1958 3 Sheets-Sheet 1

INVENTORS
Kenneth B. Bly
Walter E. Taylor
BY Thomas G. Thomas
D. C. Staley
Their Attorney July 3, 1962 K. B. BLY ETAL 3,042,452
VEHICLE WHEEL STRUCTURE Filed Oct. 16, 1958 3 Sheets-Sheet 3

INVENTORS
Kenneth B. Bly
Walter E. Taylor
BY Thomas G. Thomas

Their Attorney

3,042,452
VEHICLE WHEEL STRUCTURE
Kenneth B. Bly, Bedford, Walter E. Taylor, Seymour, and Thomas G. Thomas, Bedford, Ind., assignors to General Motors Corporation, Detroit, Mich., a corporation of Delaware
Filed Oct. 16, 1958, Ser. No. 767,606
4 Claims. (Cl. 301—6)

This invention relates to a vehicle wheel and more particularly to a vehicle wheel including a brake drum and cooling means.

In using a wheel structure which incorporates a vehicle brake drum integral with the tire supporting rim, a problem of heating within the wheel structure arises. The heat is developed on the brake drum by the shoes as they frictionally engage the drum. The dissipated heat in the brake drum and brake shoes must be transferred out of the brake structure and radiated to the atmosphere when severe braking is required. This may be accomplished by means of conduction through the various portons of the wheel and thence radiated by means of fins on the wheel structure.

It is an object of this invention to provide a unitary cast wheel structure which includes a rim secton adjoining the brake drum section by means of a narrow continuous annular portion.

It is a further object of this invention to provide cooling means adjoining the rim and drum section of the vehicle and adjacent to the narrow annular continuous portion adjoining the rim and drum sections.

It is a further object of this invention to isolate the rim section of the wheel from the drum section of the wheel and having a radial wall provided with cooling means for supporting means to the hub section of the wheel.

It is a further object of this invention to provide means on the radial supporting wall for the adjoining rim and drum sections for providing turbulence within the vehicle brake drum.

It is a further object of this invention to provide an opening in the hub section on the inboard side of the wheel and thereby direct the conduction of the heat to the outboard side of the wheel and transfer it to a spinner which in turn radiates the heat to the atmosphere.

The objects of this invention are accomplished by means of providing a rim section for mounting a vehicle tire. This rim section is isolated from the brake drum section of the wheel and connected only by means of a narrow continuous annular portion with radiating fins adjacent to this continuous annular portion. The isolation of the rim from the drum section and radiating vanes provides for a cooler rim section and the annular continuous portion is connected to a radial wall extending radially inward to a hub section. This radial supporting wall has fins extending from the wall to create turbulence within the braking structure.

The turbulence created within the braking structure provides for a more constant temperature through the braking structure and the wheel structure. An additional means for radiating heat is provided on the radially inner portion or hub section of the wheel. The inboard side of the hub section has portions removed to provide holes to receive alignment plugs. Angularly spaced between these holes are provided additional holes which block the transfer of heat through this hub section to the bearings. The heat is directed outboard to a spinner which is mounted firmly against the hub portion of the wheel. The spinner is in rotation when the wheel is rotating and thereby provides a means for radiation of the heat transferred to the spinner.

This structure thereby provides a unitary casting forming a rim section and a supporting means for the vehicle brake drum. The vehicle brake drum may be of the same unitary casting or as shown is an annular member inserted into the drum supporting section of the wheel and is hardened to provide additional wear. The wheel structure isolates the tire supporting rim from the brake drum and also provides a means of radiating the heat from the wheel structure thereby providing heat dissipating means for the vehicle brakes.

Further objects and advantages of the present invention will be apparent from the following description, reference being had to the accompanying drawings wherein a preferred embodiment of the present invention is clearly shown.

In the drawings:

FIGURE 1 is a cross section view taken on line 1—1 of FIGURE 2. This view shows the cross section of the wheel and the mounting of the wheel and the braking structure. Portions of the braking structure are removed to clarify the disclosure of the wheel.

Figure 1:
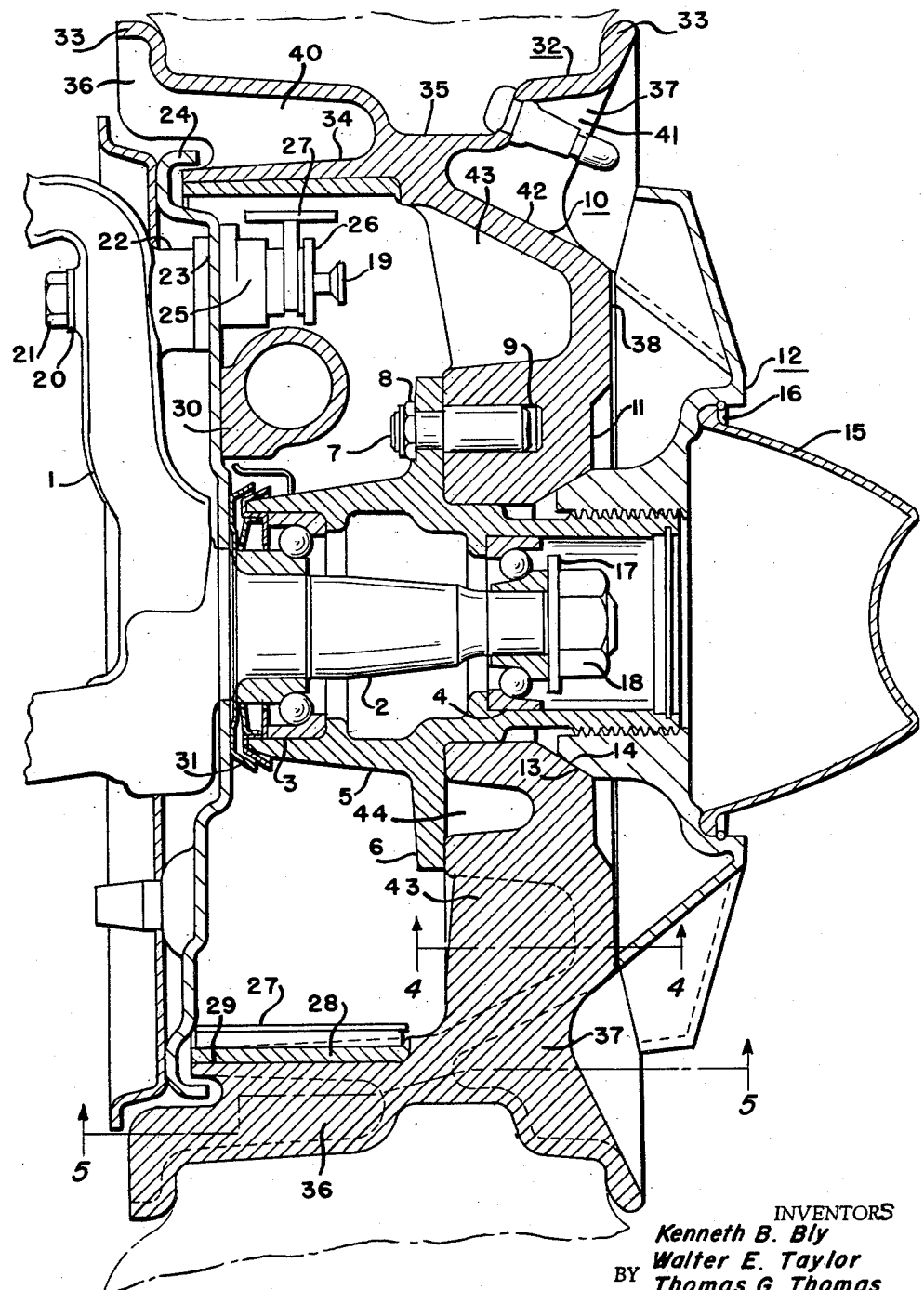
Figure 2:
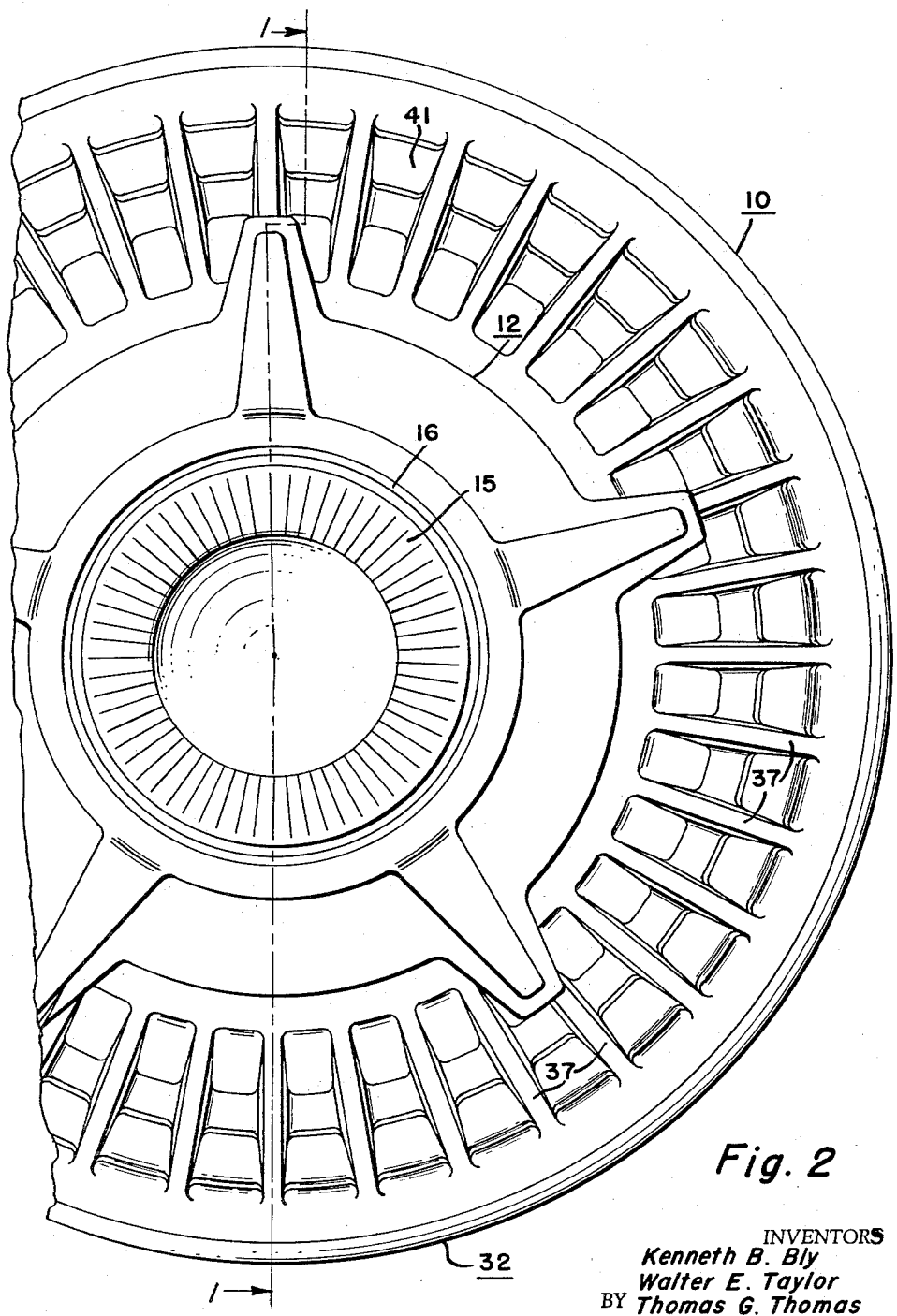
FIGURE 2 is a side elevation view of the vehicle wheel and the spinner as shown from the outboard side of the wheel.
Figure 3:
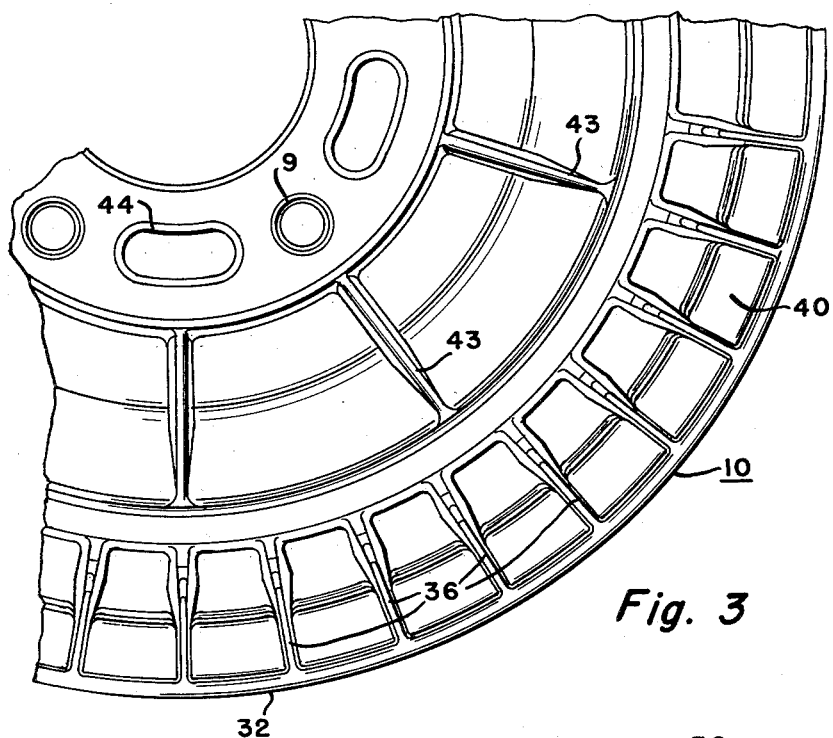
FIGURE 3 is a fragmentary view from the inboard side of the wheel and shows the radiating fins on the inboard side of the wheel.

FIGURE 1 shows the general layout of the vehicle wheel and the braking structure. The wheel is supported by means of a steering and wheel support member 1 which is provided with a spindle 2 which extends axially outboard from the steering and wheel support member 1. The spindle supports the ball bearing assemblies 3 and 4 which provide a rotatable mounting for the sleeve 5. The sleeve 5 is provided with a radially extended flange portion 6 for the mounting of a vehicle wheel. This radial flange 6 is provided with alignment bolts 7 which are secured in position by means of the nuts 8. These alignment pins 7 have a cylindrical portion extending outboard from the flange 7. This cylindrical portion is received within a cylindrical opening 9 in the hub section of the wheel 10. The hub section 11 abuts the radial flange 6 and is mounted about the outer periphery of the outboard side of sleeve 5. The hub section 11 is held in position by means of the spinner 12 which has a conical portion 13 fitting within a mating concial portion 14 on the hub section 11. The spinner 12 threadedly engages the outboard end of sleeve 5 and provides firm contact between the two mating conical sections of these two members. The spinner has five ridge portions which provide cooling of the spinner as the wheel rotates. The spinner 12 is also provided with a cover plate 15 outboard of the central portion of the spinner. The cover plate 15 is secured in position by means of the ring 16.

The sleeve 5 is rotatably mounted on the bearing assemblies 3 and 4 which are held in position by means of the washer 17 and nut 18. The steering and wheel support member 1 which provides the supporting means for the spindle 2 also supports an anchor pin 19. The anchor pin 19 extends inboard where it is securely mounted in the steering and wheel support member 1. The anchor pin 19 is fastened by means of washer 20 and nut 21. The steering and wheel support 1 is also provided with the extending portion 22 having a planar surface 23 for mounting the backing plate 24. The planar surface 23 abuts the backing plate 24. A spacer 25 is mounted adjacent to the backing plate 24 on the opposite side of the planar surface 23 of the extended portion 22 of the steering and wheel support member.

This spacer is also mounted with a guiding member 26 mounted on the anchor pin 19 to align the brake shoes 27. The brake shoe 27 is only partially shown to indicate its location in the braking structure. The brake shoe 27 frictionally engages an annular drum 28 which is mounted within the inner periphery 29 of the drum supporting structure of wheel 10. The drum 28 as shown is a separate part from that of the wheel structure and is treated to provide greater life of the brake drum.

A wheel cylinder 30 is operably positioned within the brake drum to engage the brake shoes when the vehicle brakes are actuated. The spindle 2 extending from the steering and wheel support member is also provided with washers at 31 which are mounted on the inboard side of the spindle.

The wheel structure includes a rim 32 which forms the radially outer portion of the wheel. This rim is provided with tire supporting portions 33 for mounting of the bead of the vehicle tire. The rim section 32 adjoins the drum supporting section 34 by a continuous annular portion of a narrow cross section indicated at 35. The rim 32 is isolated from the drum supporting section 34. Radiating fins extend axially from the continuous annular portion 35 between the rim and drum section. The fins 36 extend axially inboard from the continuous annular portion 34, and the fins 37 extend axially outboard from this same portion 34. These fins provide a cooling of the wheel structure and also serve as a supporting means of the rim from the drum supporting portion and from the supporting wall.

Figure 4:
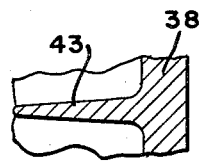
FIGURE 4 is a cross section view taken on line 4—4 of FIGURE 1.
Figure 5:
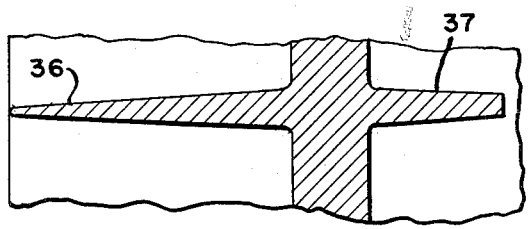
FIGURE 5 is a cross section view taken on line 5—5 of FIGURE 1.

FIGURE 5 shows a cross section view of the fins 36 and 37 of the wheel structure. FIGURE 4 also shows a fin 43 adjoining the hub section 11 and the radially extending wall 38. The latter fins provide turbulence within the braking structure and maintain a more even temperature within the wheel and braking structure. The radial wall 38 adjoins the hub section 11 on its radially inner portion and extends axially inboard and radially outward where it adjoins the annular portion 35 of the wheel structure. The hub section provides a mounting means for the vehicle wheel where it is mounted on the outer periphery of the sleeve 5. The wheel is also held in constant alignment and fixed rotatable relationship with sleeve 5 by means of alignment pins 7.

In operation, this device operates in this manner. As wheel 10 rotates, the spinner 12 and the cover plate 15 also rotate with the wheel 10.

As the brakes are actuated, the shoes 27 frictionally engage the inner periphery of brake drum 28 which creates heat within the brake structure and raises the temperature of the drum supporting portion 34 of the wheel 10. As this portion 34 of the wheel is raised in temperature, the heat is conducted to the radiating fins 36. Being the wheel is in rotation, the fins 36 create a turbulence of air within the pockets 40 of the wheel structure. This turbulence of air is caused by the rapid movement over the side of the wheel as the wheel moves forward on the road. As the air passes over the fins 36 and drum supporting portion 34 as well as the rim 32, the dissipated heat is radiated to the contacting air. As the air passes out of the pocket 40, it carries with it the heat which has been transferred to the air from these heating portions of the wheel structure. It is noted that the rim section 32 is isolated from the drum supporting portion 34 and that a minimum of heat is transmitted to the rim 32. The heat is radiated to the atmosphere thereby providing a relatively cool tire supporting rim 32.

The rim section 32 is supported by a continuous section 35 which adjoins the rim 32 and the drum supporting portion 34. The heat which is dissipated adjacent to this continuous portion 35 is conducted by the fins 36 and 37. The passing of air by fins 37 creates turbulence within the pockets 41 which in turn provides for rapid passing of air over the surface of the rim 32, the fins 37 and the supporting portion 42 of wheel 10. This process provides for the cooling of the supporting portion 42.

A third row of angularly spaced fins are shown at 43 on the inboard side of the radially supporting wall 38. These fins 43 create turbulence within the vehicle brake drum and around the parts of the brakes. This turbulence of air within the brake drum tends to provide a relative constant temperature within the braking structure. The heat which is transmitted to the wall 42 and 38 is radiated to the atmosphere through the fins 37. Additional heat which may be conducted through the wall 38 is directed through the hub section 11 to the mating cones 13 and 14. The holes 44 direct the heat outboard in the hub section of the wheel.

The spinner 12 is securely fastened to the outboard end of sleeve 5 and is provided with a firm seating of the mating cones 13 and 14. This firm seating aids the conduction of heat to the spinner which is mounted on the outboard side of the wheel. This spinner also creates a turbulence of air as the air passes by the outboard side of the wheel as the wheel is in motion. The spinner 12 is mounted so that it extends axially outboard from the wheel structure and thereby is in a position to provide considerable cooling of the hub section of the wheel and provides for a cool hub section adjoining the ball bearing assembly for good operating conditions.

While the embodiment of the present invention as herein disclosed constitutes a preferred form, it is to be understood that other forms might be adopted.

What is claimed is as follows:

1. An integral vehicle wheel structure comprising in combination, a drop center rim having an annular drop center portion, an annular flange extending from said drop center portion forming, a brake drum positioned in spaced relation within said rim with one edge at the axial center of said rim, a plurality of fins angularly spaced between and connecting said rim and said drum to provide radiation of heat to the atmosphere, a wheel hub, a rim supporting wall connecting said hub and said drop center portion of said rim, a plurality of fins angularly spaced about the inboard side of said wall connecting said hub and drop center portion to create turbulence of air within the brake drum, a plurality of spaced radial fins connecting said wall and said rim on the outboard side of said wall to provide radiation of heat from said wall and said drum to the atmosphere upon rotation of said wheel.

2. A wheel structure comprising in combination, a wheel having an annular rim, a brake drum mounted in spaced relation within said rim and having an edge connected to the axial center of said rim, a plurality of fins positioned between and connecting said drum and said rim to provide radiation of heat from said drum section on the inboard side of said wheel, a wheel hub, a supporting wall connecting said hub with said edge of said drum and the axial center portion of said vehicle wheel, a plurality of fins angularly spaced on the inboard side of said supporting wall and connected with said hub, a plurality of radiating fins on the outboard side of said supporting wall connecting said supporting wall and said rim to provide radiation of heat on the outboard side of said wheel, a surface formed on the inner periphery of said hub for engagement by a spinner, said spinner having a surface portion to provide a firm contact with the surface portion of said hub to transfer heat thereby to said spinner, a plurality of raised radiating surfaces formed on said spinner to radiate heat from said spinner to the passing air stream on the outboard side of said wheel.

3. A wheel structure comprising in combination a wheel having a drop center rim, a brake drum mounted in spaced relation within said rim and having an edge connecting to the drop center portion of said rim, a plurality of fins positioned between and connecting said rim and said drum to provide radiation of heat on the inboard side of said wheel, a wheel hub having a wheel mounting surface adapted for mounting on a rotatable member, a supporting wall connecting said hub with said edge of said drum and the drop center portion of said rim, a plurality of fins positioned on the inboard side of said supporting wall and connected with said hub to create turbulence of air within said drum, a plurality of radiating fins on the outboard side of said wheel connecting said rim with said supporting wall and providing radiation of heat on the outboard side of said vehicle wheel, a spinner, said hub and said spinner having mating surface to provide thermal contact to permit transfer of heat from said hub section to said spinner, said spinner having a plurality of raised radiating surfaces to provide radiation of heat on the outboard side of said vehicle wheel when said wheel is in motion.

4. The combination wheel structure comprising, a wheel having a drop center rim, a brake drum mounted in spaced relation within said rim and having an edge connected to the drop center portion of said rim, a plurality of fins positioned between and connecting said rim and said drum to provide radiation of heat on the inboard side of said wheel, a hub having a surface for mounting on a rotatable member, a supporting wall connecting said hub to said edge of said drum and the center portion of said rim, a plurality of fins positioned on the inboard side of said supporting wall to create turbulence of air within said brake drum, a plurality of fins connecting said rim and said supporting wall on the outboard side of said vehicle wheel to provide radiation of heat from the outboard side of said wheel, a rotatable member having a mating surface to provide a mounting for said hub, a spinner, fastening means on said rotating member for reception of the spinner, said spinner and said hub section having mating cone-shaped surfaces to firmly seat the wheel in position and provide transfer of heat from said hub section to said spinner, a plurality of raised surface portion formed on said spinner to provide radiation of heat from said spinner to the passing air stream when said vehicle wheel is in motion.

References Cited in the file of this patent
UNITED STATES PATENTS

| | | |
|---|---|---|
| 1,858,663 | Frank | May 17, 1932 |
| 2,019,508 | Sauzedde | Nov. 5, 1935 |
| 2,105,317 | Frank | Jan. 11, 1938 |
| 2,906,558 | Forbush | Sept. 29, 1959 |

FOREIGN PATENTS

| | | |
|---|---|---|
| 341,778 | Great Britain | Jan. 22, 1931 |